United States Patent
Liu et al.

(10) Patent No.: US 10,409,119 B2
(45) Date of Patent: Sep. 10, 2019

(54) SPECIAL-SHAPED DISPLAY PANEL AND DISPLAY DEVICE

(71) Applicant: Xiamen Tianma Micro-Electronics Co., Ltd., Xiamen (CN)

(72) Inventors: Bozhi Liu, Xiamen (CN); Xiaoxiao Wu, Xiamen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/834,222

(22) Filed: Dec. 7, 2017

(65) Prior Publication Data

US 2019/0011786 A1    Jan. 10, 2019

(30) Foreign Application Priority Data

Jul. 4, 2017    (CN) .......................... 2017 1 0536216

(51) Int. Cl.
*G02F 1/1343* (2006.01)
*G02F 1/1335* (2006.01)

(52) U.S. Cl.
CPC .... *G02F 1/134309* (2013.01); *G02F 1/13439* (2013.01); *G02F 1/133512* (2013.01);
(Continued)

(58) Field of Classification Search
CPC ....................... G02F 2201/56; G02F 1/133512
See application file for complete search history.

(56) References Cited

U.S. PATENT DOCUMENTS

2009/0160748 A1* 6/2009 Kimura ............. G02F 1/134363
345/94
2010/0289994 A1* 11/2010 Nonaka ............. G02F 1/133514
349/108
(Continued)

FOREIGN PATENT DOCUMENTS

| CN | 105527764 A | * | 4/2016 |
| CN | 105527764 A | | 4/2016 |
| CN | 106019753 A | | 10/2016 |

OTHER PUBLICATIONS

Chinese OA dated Mar. 25, 2019 for corresponding CN Application No. 201710536216.3.

*Primary Examiner* — Alexander P Gross
(74) *Attorney, Agent, or Firm* — Tarolli, Sundheim, Covell & Tummino LLP

(57) ABSTRACT

A special-shaped display panel having a display area and a peripheral area, including: a peripheral light-shading layer at least partially located in the peripheral area and defining the display area; and a plurality of edge pixels, each of the edge pixels comprising an aperture portion located in the display area, and a light-shading portion located in the peripheral area and covered by the peripheral light-shading layer an area of the aperture portion of each edge pixel is defined as S, a transmittance of each edge pixel is defined as T, it is further defined that M=S*T, and the M values of the edge pixels are identical. Such solution improves the edge color cast problem of special-shaped display panel, makes the color displayed at the edge of the special-shaped display panel uniform, and improves the visual effect of the edge of the display panel.

8 Claims, 6 Drawing Sheets

(52) U.S. Cl.
CPC .. _G02F 1/133514_ (2013.01); _G02F 2201/122_ (2013.01); _G02F 2201/123_ (2013.01); _G02F 2201/52_ (2013.01); _G02F 2201/56_ (2013.01)

(56) References Cited

U.S. PATENT DOCUMENTS

2012/0008073 A1* 1/2012 Ota .................. G02F 1/133707
    349/106
2016/0291376 A1* 10/2016 Iwatsu ............. G02F 1/133512

* cited by examiner

SPECIAL-SHAPED DISPLAY PANEL AND DISPLAY DEVICE

CROSS-REFERENCE TO RELATED APPLICATIONS

The present application claims priority to Chinese Patent Application No. 201710536216.3, filed on Jul. 4, 2017, the content of which is incorporated herein by reference in its entirety.

TECHNICAL FIELD

The present relates to the field of display technologies and, particularly, relates to a special-shaped display panel and a display device containing the special-shaped display panel.

BACKGROUND

With the development of science and technology, a display device with a display panel has been used more and more widely, and people's demands on the display panel are becoming more and more diverse, not only to meet conventional index such as large size, high definition and so on, but also to have diverse outlooks. Accordingly, a special-shaped display panel appears.

The special-shaped display panel has made a breakthrough in the limitation of the univocal rectangular structure of the display panel, not only diversifying the display effect but also widening the application of the display panel, and the display panel has been successfully applied to various wearable electronic designs, such as watches, glasses or smart bracelet. Compared with the conventional display panel, a key difference of the special-shaped display panel lies in that its display area is in a special shape rather than the rectangle, for example circle, ring, rhombus, etc. While the pixels in the display panel are mainly rectangular or in other relatively regular shape. Therefore, when the pixels are applied to the special-shaped display panel, in the edge area of the display panel, the pixels cannot sufficiently match a border line of the display panel, causing that zigzag textures present on the edge area of the display panel during display and a color cast problem easily occurs, adversely affecting the display effect of the edge area. Therefore, how to reduce or even eliminate the zigzag textures in the edge area of a special-shaped display panel while solving the color cast problem in the edge area and improving the display effect of the special-shaped display panel has become an urgent problem to be solved in the field of special-shaped display.

A conventional special-shaped display panel includes a display area located in the center of the panel and a peripheral area located in the peripheral area of the display panel, the display panel is a special-shaped structure, and the peripheral area is located at the peripheral edge of the special-shaped display panel. The display area is provided with a pixel structure including a plurality of pixels, and each pixel includes a plurality of edge pixels. Since the display panel is a special-shaped structure, the edge pixels of the pixels close to the peripheral area have different light extraction areas, resulting in different aperture ratio in different edge pixel. Therefore, the edge of the special-shaped display panel presents non-uniform colors, resulting in the color cast problem. At present, in order to improve the color cast problem, the peripheral area of the display panel can be designed into a zigzag structure such that the edge pixels in each row of pixels close to the peripheral area have an identical area. However, due to zigzag structure of the peripheral area of the display panel, the edge of the display panel will present unsmooth border line or even zigzag edge, which adversely affect the visual effects.

SUMMARY

A purpose of the present disclosure is to provide a special-shaped display panel and a display device, to solve the problems of non-uniform colors or zigzag textures at the edge of the display panel and the display device and improve the visual effect of the display panel.

A first aspect of the present disclosure provides special-shaped display panel having a display area and a peripheral area, including: a peripheral light-shading layer at least partially located in the peripheral area and defining the display area; and a plurality of edge pixels, each of the edge pixels including an aperture portion located in the display area, and a light-shading portion located in the peripheral area and covered by the peripheral light-shading layer; wherein an area of the aperture portion of each of the edge pixels is defined as S, a transmittance of each of the edge pixels is defined as T, it is further defined that M=S*T, and the M values of all of the edge pixels are identical.

A second aspect of the present disclosure provides a display device including the special-shaped display panel as described above.

BRIEF DESCRIPTION OF DRAWINGS

The following accompanying drawings are used to describe the non-restrictive embodiments of the present disclosure, and the features, purposes and advantages of the present disclosure will become clearer with reference to these drawings.

DESCRIPTION OF EMBODIMENTS

The present disclosure is further described with reference to the accompanying drawings and embodiments. It should be understood that the specific embodiments described are merely used to explain the present disclosure but not to limit the present disclosure. Moreover, in order to facilitate the description, the drawings only show related portions rather than the whole structure.

Figure 1:
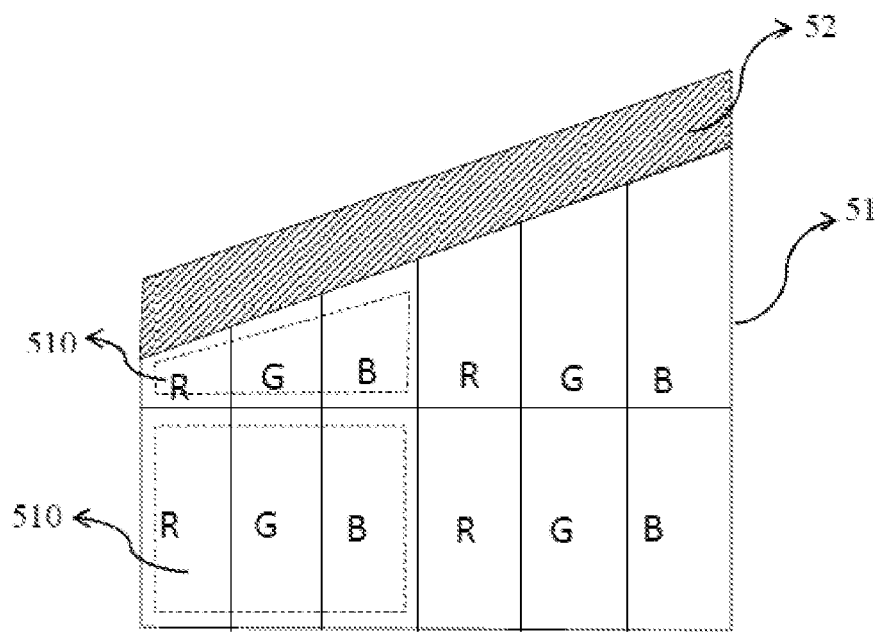
FIG. 1 is a partial structural schematic diagram of a pixel of a special-shaped display panel in the conventional art.
Figure 2:
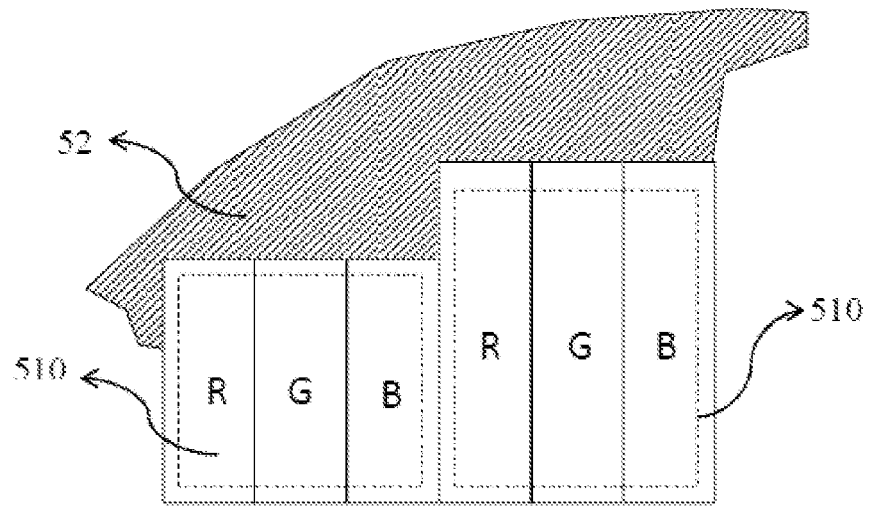
FIG. 2 is another partial structural schematic diagram of a pixel of a special-shaped display panel in the conventional art.

FIG. 1 is a partial structural schematic diagram of a pixel of a special-shaped display panel in the conventional art, and FIG. 2 is another partial structural schematic diagram of a pixel of a special-shaped display panel in the conventional art. As shown in FIG. 1, the display panel includes a display area 51 located in the center of the panel and a peripheral area 52 located in the peripheral area of the display panel, the display panel is a special-shaped structure, and the peripheral area 52 is located at the peripheral edge of the special-shaped display panel. The display area 51 is provided with a pixel structure including a plurality of pixels 510, and each pixel includes a plurality of edge pixels. Since the display panel is a special-shaped structure, the edge pixels of the pixels close to the peripheral area 52 have different light extraction areas, resulting in different aperture ratio in different edge pixel. Therefore, the edge of the special-shaped display panel presents non-uniform colors, resulting in the color cast problem. At present, in order to improve the color cast problem, as shown in FIG. 2, the peripheral area 52 of the display panel can be designed into a zigzag structure such that the edge pixels in each row of pixels 510 close to the peripheral area 52 have an identical area. However, due to zigzag structure of the peripheral area 52 of the display panel, the edge of the display panel will present unsmooth border line or even zigzag edge, which adversely affect the visual effects.

The present disclosure provides a special-shaped display panel having a display area and a peripheral area, including: a peripheral light-shading layer at least partially located in the peripheral area and defining the display area; and a plurality of edge pixels. Each of the edge pixels includes an aperture portion located in the display area, and a light-shading portion located in the peripheral area and covered by the peripheral light-shading layer. An area of the aperture portion of each of the edge pixels is defined as S, a transmittance of each of the edge pixels is defined as T, it is further defined that M=S*T, and then the M values of all the edge pixels are identical, which improves the color cast problem at the edge of the special-shaped display panel, makes the color displayed at the edge of the special-shaped display panel uniform, and meantime optimizes the edge zigzag texture of the special-shaped display panel and improves the visual effect of the edge of the display panel.

Figure 3:
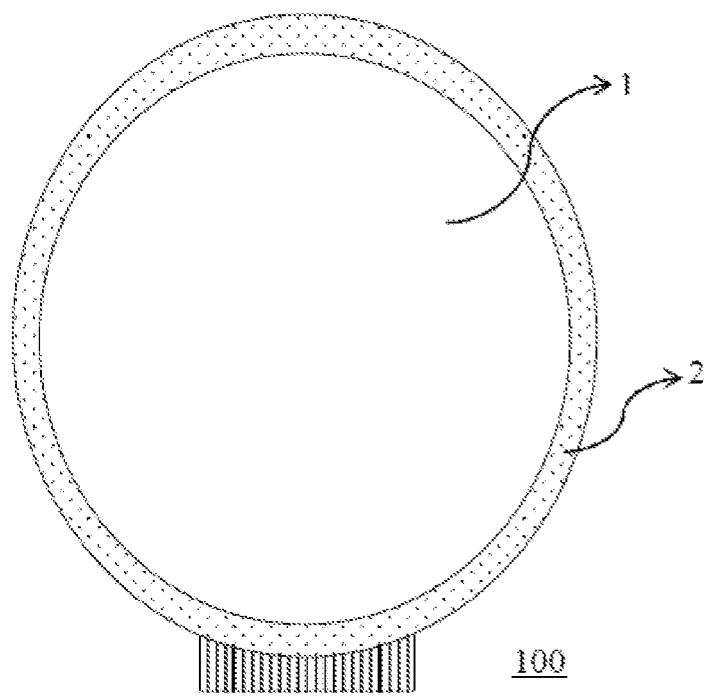
FIG. 3 is a structural schematic diagram of a special-shaped display panel according to an embodiment of the present disclosure.

First, the present disclosure provides a special-shaped display panel. As shown in FIG. 3, which is a structural schematic diagram of a special-shaped display panel according to an embodiment of the present disclosure, the special-shaped display panel 100 includes a display area 1 and a peripheral area 2 surrounding the display area.

In the present embodiment, the special-shaped display panel 100 is a circular display panel, and the display area presents a circular display, that is, a border line of the display area is a circular peripheral edge, the peripheral area 2 is a circular ring surrounding the display area 1. In other embodiments, the border line of the display area of the special-shaped display panel can also be shaped in other non-rectangular shapes, such as rhombus, ellipse, hexagon or triangle, etc., or the border line of the display area of the special-shaped display panel is shaped to include an arc line, for examples fan-shaped, which is not limited in the present embodiment.

Figure 4:
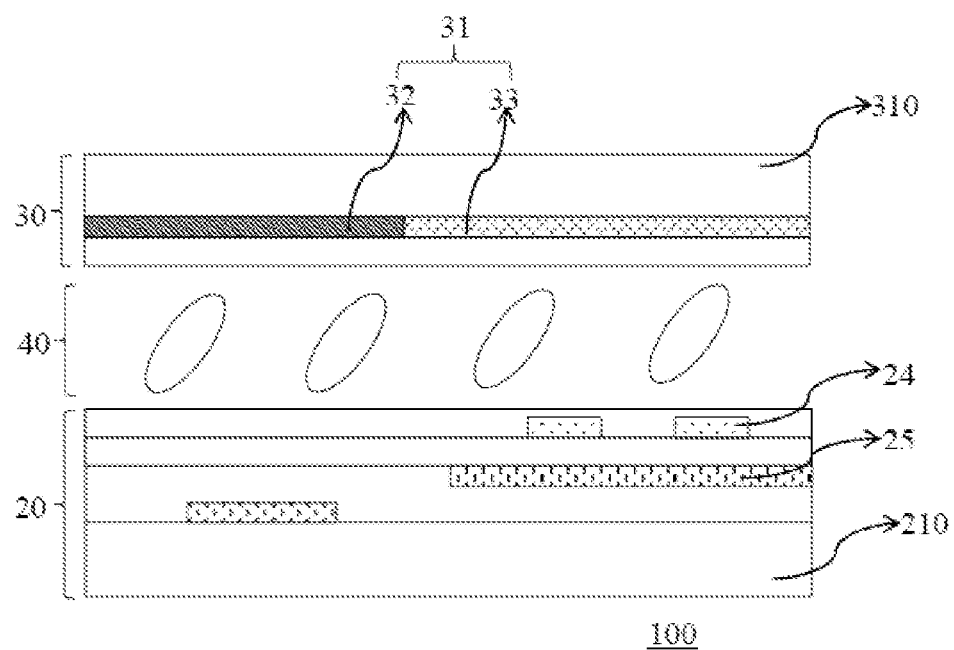
FIG. 4 is a cross sectional view of a special-shaped display panel according to an embodiment of the present disclosure.
Figure 5:
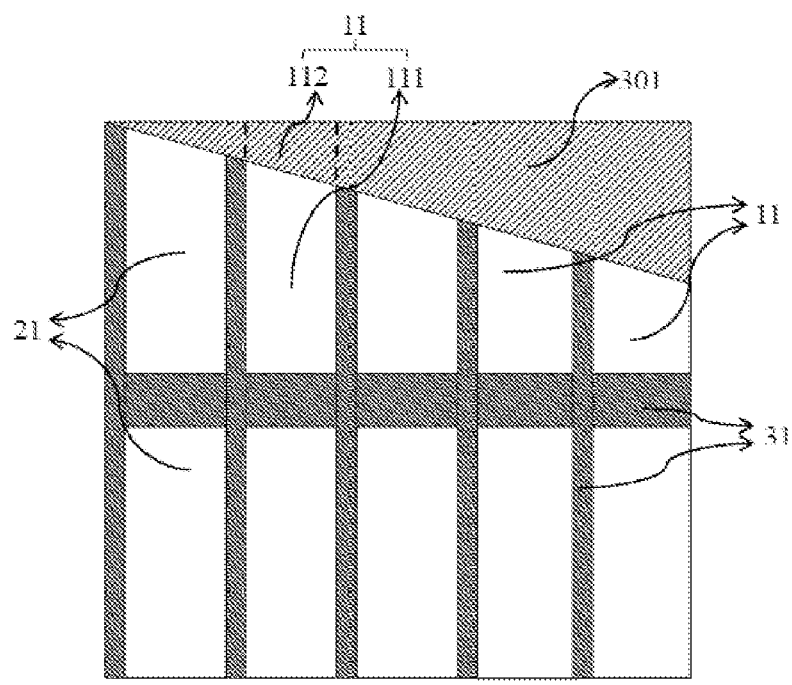
FIG. 5 is a partial schematic diagram of pixels of a special-shaped display panel provided in the present embodiment.

The display panel can be a liquid crystal display panel, an organic light-emitting display panel, a direct-type nanowire light-emitting diode display panel, or other types of display panels, which is not limited in the present embodiment. The present embodiment adopts the liquid crystal display panel, and the specific structure can refer to FIGS. 3-5. FIG. 4 is a cross sectional view of a special-shaped display panel provided in the present embodiment of the present disclosure, and FIG. 5 is a partial schematic diagram of pixels of the special-shaped display panel provided in the present embodiment. The special-shaped display panel 100 includes an array substrate 20, a color film substrate 30, and a liquid crystal layer 40 sealed between the array substrate 20 and the color film substrate 30.

The color film substrate 30 includes an upper substrate 310 and a color filter 31 located on the upper substrate 310. The color filter 31 includes a plurality of color resists 33 in different colors and a black matrix 32 located between every two adjacent color resists 33. The black matrix 32 on the color film substrate 30 corresponds to an area on the array substrate 20 where a metallic wiring is located. The metallic wiring can be for example data lines and scan lines, and the data lines and the scan lines intersect with one another, so as to define a plurality of pixels 21 arranged in an array. A pixel electrode 24 is arranged in each pixel 21. The data line for example can be connected with the pixel electrode 24 in a corresponding pixel 21 by a thin film transistor, for providing a data signal for the pixel electrode 24. The array substrate 20 further includes a lower substrate 210 and a common electrode 25 located on the lower substrate 210. The pixel electrodes 24, the data lines, and the scan lines are also located on the lower substrate 210. When displaying, under control of a driving voltage provided by the pixel electrode and the common electrode, light goes through an aperture portion of each pixel, then through the liquid crystal layer between the array substrate and the color film substrate, and then exits from the color resists respectively corresponding to the pixels, thereby realizing the preset color display and the display function.

The liquid crystal display panel for example a fringe field switching (FFS) liquid crystal display panel or an in-plane switching (IPS) liquid crystal display panel, which is not limited herein.

Further, as shown in FIG. 5, the special-shaped display panel further includes a peripheral light-shading layer 301 at least partially located in the peripheral area 2 and defining the display area 1. The peripheral light-shading layer 301 for example can be located on the color film substrate and is in a same layer as the black matrix. The special-shaped display panel further includes a plurality of edge pixels 11. Each of the edge pixels 11 includes an aperture portion 111 and a light-shading portion 112. The aperture portion 111 of each of the edge pixels 11 is located in the display area 1 and corresponds to one color resist 33, while the light-shading portion 112 of each of the edge pixels is located in the peripheral area 2 and is covered by the peripheral light-shading layer 301. When displaying, the light can successively go through the aperture portions and the color resists, such that the edge pixel presents a same color as the color of the corresponding color resist.

Figure 6:
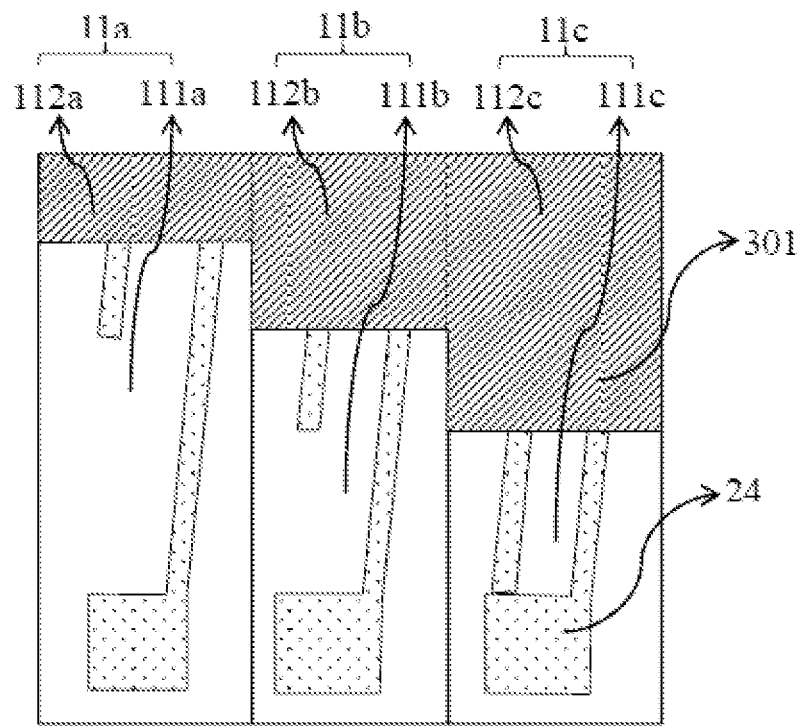
FIG. 6 is a schematic diagram of a group of edge pixels of a special-shaped display panel according to an embodiment of the present disclosure.
Figure 7:
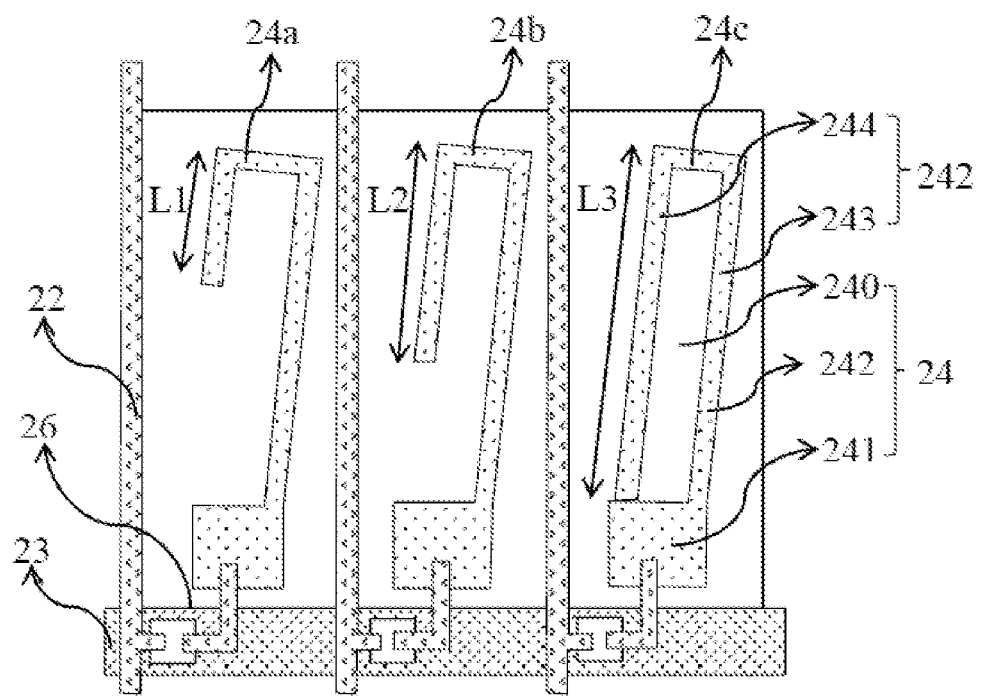
FIG. 7 is a schematic diagram of pixel electrodes of the edge pixels shown in FIG. 6.

The specific arrangement of the edge pixels in the special-shaped display panel can refer to FIGS. 6-7. FIG. 6 is a schematic diagram of a group of edge pixels of a special-shaped display panel according to an embodiment of the present disclosure, and FIG. 7 is a schematic diagram of the pixel electrodes of the edge pixels shown in FIG. 6. In the present embodiment, the edge pixels 11 at least include a first edge pixel 11a, a second edge pixel 11b, and a third edge pixel 11c; and the first edge pixel 11a, the second edge pixel 11b, and the third edge pixel 11c are adjacent to one another. The first edge pixel 11a includes a first aperture portion 111a and a first light-shading portion 112a; the second edge pixel 11b includes a second aperture portion 111b and a second light-shading portion 112b; and the third edge pixel 11c includes a third aperture portion 111c and a third light-shading portion 112c. The first aperture portion 111a, the second aperture portion 111b, and the third aperture portion 111c respectively correspond to the color resists in different colors, for example, the first aperture portion 111a corresponds to a red color resist, the second aperture portion 111b corresponds to a green color resist, and the third aperture portion 111c corresponds to a blue color resist, which are not limited in the present disclosure.

The first light-shading portion 112a, the second light-shading portion 112b, and the third light-shading portion 112c correspond to the peripheral light-shading layer 301. Since the display area of the special-shaped display panel is irregular-shaped, i.e., a contour line of the peripheral light-shading layer 301 toward the display area is irregular-shaped, for example shaped as a polygonal line show in FIG. 6, such that each of the edge pixels has a different light-shading portion from other edge pixels. In the present embodiment, the area of the first light-shading portion 112a is smaller than the area of the second light-shading portion 112b, and the area of the second light-shading portion 112b is less than the area of the third light-shading portion 112c. Since a total area of each of the edge pixels (i.e., a sum of the area of the aperture portion and the area of the light-shading portion) is identical, therefore, the area of the first aperture portion 111a is larger than the area of the second aperture portion 111b, and the area of the second aperture portion 111b is larger than the area of the third aperture portion 111c. In other words, in the present embodiment, the area of the aperture portion of the first edge pixel 11a is larger than the area of the aperture portion of the second edge pixel 11b, and the area of the aperture portion of the second edge pixel 11b is larger than the area of the aperture portion of the third edge pixel 11c.

Further, data lines 22 and scan lines 23 are placed in the area where the edge pixels are located, intersect with one another, and surround the respective edge pixels. A pixel electrode 24 is placed in each of the edge pixels. Each of data lines 22 is connected with a corresponding pixel electrode 24 by a thin film transistor 26. The data lines 22, the scan lines 23, and the thin film transistor 26 are covered by the black matrix on the color film substrate.

Still further, each pixel electrode 24 include a block-shaped electrode 241, at least two strip-shaped electrodes 242 connected with the block-shaped electrode 241, and at least one slit 240 of which each located between two adjacent strip-shaped electrodes 242. Tail ends of the at least two strip-shaped electrodes 242 are connected together. A length of the pixel electrode 24 of each of the edge pixels is identical, that is, a sum of a length of the strip-shaped electrode and a length of the block-shaped electrode along an extending direction of the strip-shaped electrode for each pixel electrode is identical. In the present embodiment, the at least two strip-shaped electrodes 242 include a main strip-shaped electrode 243 and an auxiliary strip-shaped electrode 244, a head end of the main strip-shaped electrode 243 is connected with the block-shaped electrode 241, a tail end of the auxiliary strip-shaped electrode 244 is connected with a tail end of the main strip-shaped electrode 243, and a head end of the auxiliary strip-shaped electrode 244 is disconnected with the block-shaped electrode.

Further, according to an embodiment, extending directions of the strip-shaped electrodes of all of the edge pixels are parallel to one another. The extending directions of the main and auxiliary strip-shaped electrodes 243, 244 of each edge pixel are parallel to each other, and the lengths of the main strip-shaped electrodes 243 in all of the edge pixels are identical.

Further, according to an embodiment, widths of the strip-shaped electrodes of a first pixel electrode, a second pixel electrode, and a third pixel electrode are identical; and widths of the slits of the first pixel electrode, the second pixel electrode, and the third pixel electrode are identical too.

As shown in FIGS. 6-7, a first pixel electrode 24a is placed in the first edge pixel 11a, a second pixel electrode 24b is placed in the second edge pixel 11b, and a third pixel electrode 24c is placed in the third edge pixel 11c. A length L1 of the auxiliary strip-shaped electrode of the first pixel electrode 24a is small than a length L2 of the auxiliary strip-shaped electrode of the second pixel electrode 24b; and the length L2 of the auxiliary strip-shaped electrode of the second pixel electrode 24b is smaller than a length L3 of the auxiliary strip-shaped electrode of the third pixel electrode 24c. That is, when an area of the aperture portion of the first edge pixel is larger than an area of the aperture portion of the second edge pixel, and the area of the aperture portion of the second edge pixel is larger than an area of the aperture portion of the third edge pixel, the length of the auxiliary strip-shaped electrode of the first pixel electrode is smaller than the length of the auxiliary strip-shaped electrode of the second pixel electrode, and the length of the auxiliary strip-shaped electrode of the second pixel electrode is smaller than the length of the auxiliary strip-shaped electrode. As such, the length of the auxiliary strip-shaped electrode of the pixel electrode in each of the edge pixels is set according to the area of the aperture portion of the edge pixel in question, thereby adjusting transmittance of the edge pixels.

For example, the area of the aperture portion of each of the edge pixels 11 is defined as S, and the transmittance of each of the edge pixels 11 is defined as T. Further, an area of the first aperture portion 111a is defined as S1, an area of the second aperture portion 111b is defined as S2, and an area of the third aperture portion 111c is defined as S3; the transmittance of the first edge pixel is defined as T1, the transmittance of the second edge pixel is defined as T2, and the transmittance of the third edge pixel is defined as T3. The transmittance of the respective edge pixel is adjusted by setting the length of the auxiliary strip-shaped electrode 244 of the pixel electrode 24 in the corresponding edge pixel 11, making that: S1*T1=S2*T2=S3*T3. That is, when it is defined that M=S*T, the M values of the first edge pixel, the second edge pixel, and the third edge pixel are identical, which improves the color cast problem at the edge of the special-shaped the display panel and homogenizes the color display at the edge of the special-shaped display panel while optimizing the edge zigzag texture of the special-shaped display panel, thereby improving the visual effect of the display panel.

Figure 8:
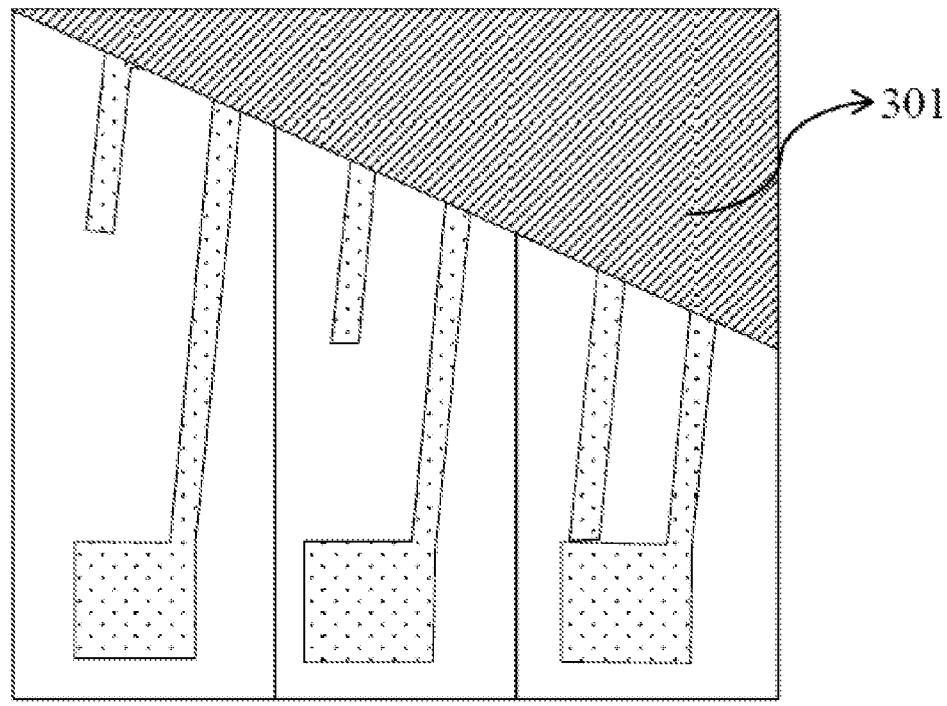
FIG. 8 is a schematic diagram of edge pixels of a special-shaped display panel according to another embodiment of the present disclosure.

FIG. 8 is a schematic diagram of the edge pixel of the special-shaped display panel according to another embodiment of the present disclosure. The special-shaped display panel shown in FIG. 8 is similar to the special-shaped display panel shown in FIGS. 1-7 in structure, which will not be repeated herein. The difference lies in that, the contour line of the peripheral light-shading layer 301 covering the first edge pixel, the second edge pixel, and the third edge pixel, is a straight line.

In the present embodiment, it is defined that the area of the aperture portion of each of the edge pixels is S, the transmittance of each of the edge pixels 11 is T, and M=S*T. By setting the length of the auxiliary strip-shaped electrode of the pixel electrode in each of the edge pixels, the transmittance of each of the edge pixels is regulated such that the M values of the first edge pixel, the second edge pixel, and the third edge pixel are identical, which improves the color cast problem at the edge of the special-shaped the display panel and homogenizes the color display at the edge of the special-shaped display panel while optimizing the edge zigzag texture of the special-shaped display panel, thereby improving the visual effect of the display panel.

Figure 9:
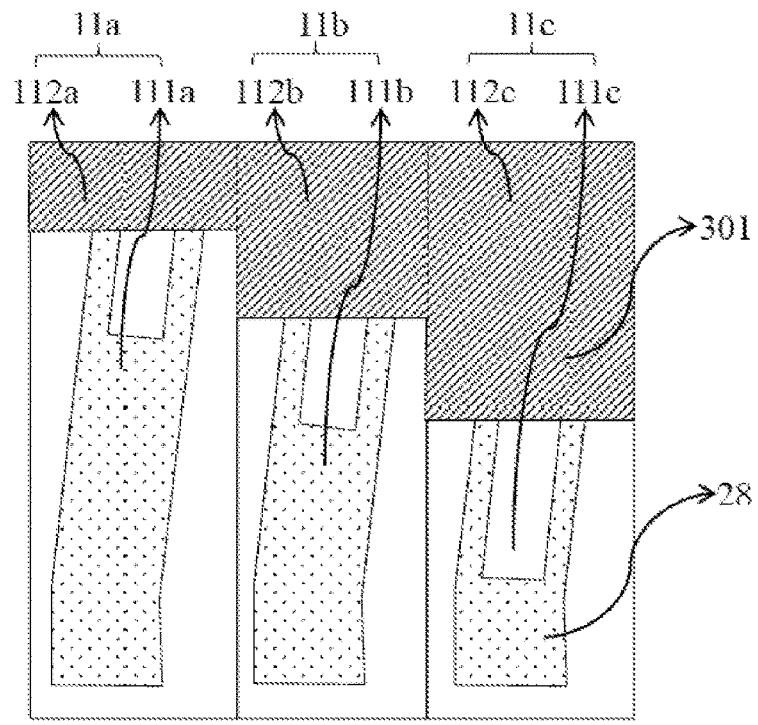
FIG. 9 is a schematic diagram of a group of edge pixels of a special-shaped display panel according to still another embodiment of the present disclosure.
Figure 10:
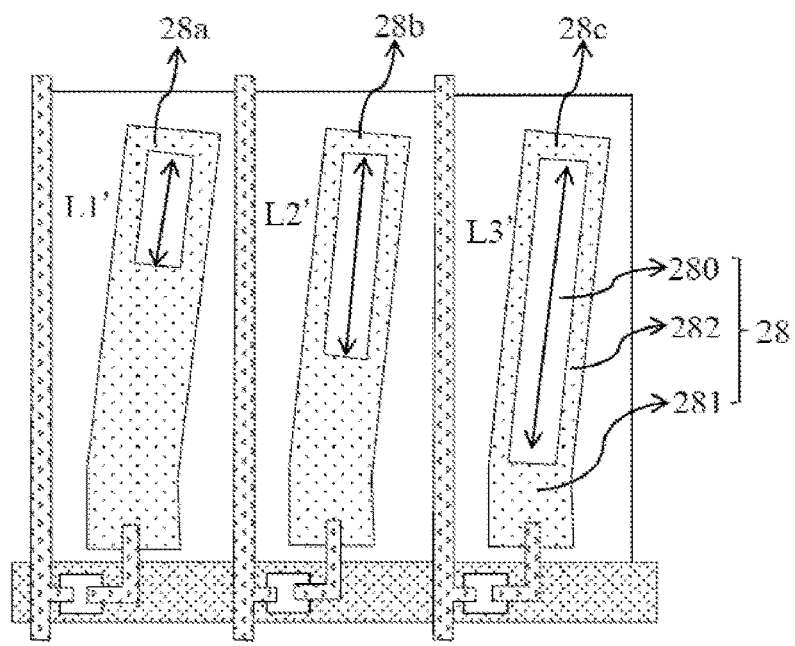
FIG. 10 is a schematic diagram of the pixel electrodes of the edge pixels in FIG. 9.

FIG. 9 is a schematic diagram of a group of edge pixels of the special-shaped display panel according to still another embodiment of the present disclosure, and FIG. 10 is a schematic diagram of the pixel electrodes of the edge pixels in FIG. 9. As shown in FIGS. 3-5 and 9-10, the first aperture portion 111*a*, the second aperture portion 111*b*, and the third aperture portion 111*c* respectively correspond to the color resists of different colors, for example: the first aperture portion 111*a* corresponds to a red color resist, the second aperture portion 111*b* corresponds to a green color resist, and the third aperture portion 111*c* corresponds to a blue color resist, which are not limited in the present disclosure.

The first light-shading portion 112*a*, the second light-shading portion 112*b*, and the third light-shading portion 112*c* correspond to the peripheral light-shading layer 301, and a contour line of the peripheral light-shading layer 301 toward the display area is a polygonal line. In the present embodiment, a total area of each of the edge pixels (i.e., a sum of the area of the aperture portion and an area of the light-shading portion) is identical, the area of the aperture portion of the first edge pixel 11*a* is larger than the area of the aperture portion of the second edge pixel 11*b*, and the area of the aperture portion of the second edge pixel 11*b* is larger than the area of the aperture portion of the third edge pixel 11*c*.

With reference to FIGS. 9-10, in the present embodiment, each pixel electrode 28 includes a block-shaped electrode 281 and at least two strip-shaped electrodes 282 connected with the block-shaped electrode 281. Head ends of the at least two strip-shaped electrodes 282 are respectively connected with the block-shaped electrode 281, and tail ends of the at least two strip-shaped electrode 282 are connected together, thereby defining a strip-shaped slit 280. The lengths of the pixel electrodes 28 of all of the edge pixels are identical, that is, a sum of the length of the strip-shaped electrode and a length of the block-shaped electrode along an extending direction of the strip-shaped electrode for each of the pixel electrodes 28 is identical.

Further, extending directions of the strip-shaped electrodes in all of the edge pixels are parallel to one another; a width of the strip-shaped electrode of the first pixel electrode, a width of the strip-shaped electrode of the second pixel electrode, and a width of the strip-shaped electrode of the third pixel electrode are identical; and a width of the slit of the first pixel electrode, a width of the slit of the second pixel electrode, and a width of the slit of the third pixel electrode are identical too.

In the present embodiment, the first pixel electrode 28*a* is placed in the first edge pixel 11*a*, the second pixel electrode 28*b* is placed in the second edge pixel 11*b*, and the third pixel electrode 28*c* is placed in the third edge pixel 11*c*; the length L1' of the slit of the first pixel electrode 28*a* is smaller than the length L2' of the slit of the second pixel electrode 28*b*, and the length L2' of the slit of the second pixel electrode 28*b* is smaller than the length L3' of the slit of the third pixel electrode 24*c*. That is, when the area of the aperture portion of the first edge pixel is larger than the area of the aperture portion of the second edge pixel, and the area of the aperture portion of the second edge pixel is larger than the area of the aperture portion of the third edge pixel, the length of the slit of the first pixel electrode is smaller than the length of the slit of the second pixel electrode, and the length of the slit of the second pixel electrode is smaller than the length of the slit of the third pixel electrode. As such, the lengths of the slits of the pixel electrodes in all of the edge pixels are regulated according to the areas of the aperture portions of all of the edge pixels, thereby regulating the transmittance of each of the edge pixels.

For example, it is defined that the area of the aperture portion of each of the edge pixel is S and the transmittance of each of the edge pixel is T; the area of the first aperture portion 111*a* is S1, the area of the second aperture portion 111*b* is S2, and the area of the third aperture portion 111*c* is S3; and the transmittance of the first edge pixel is T1, the transmittance of the second edge pixel is T2, and the transmittance of the third edge pixel is T3. By setting the lengths of the slits of the pixel electrodes of all of the edge pixels, the transmittance of each of the edge pixels is regulated such that S1*T1=S2*T2=S3*T3. That is to say, when it is defined that M=S*T, the M values of the first edge pixel, the second edge pixel, and the third edge pixel are identical, which improves the color cast problem at the edge of the special-shaped the display panel and homogenizes the color display at the edge of the special-shaped display panel while optimizing the edge zigzag texture of the special-shaped display panel, thereby improving the visual effect of the display panel.

Figure 11:
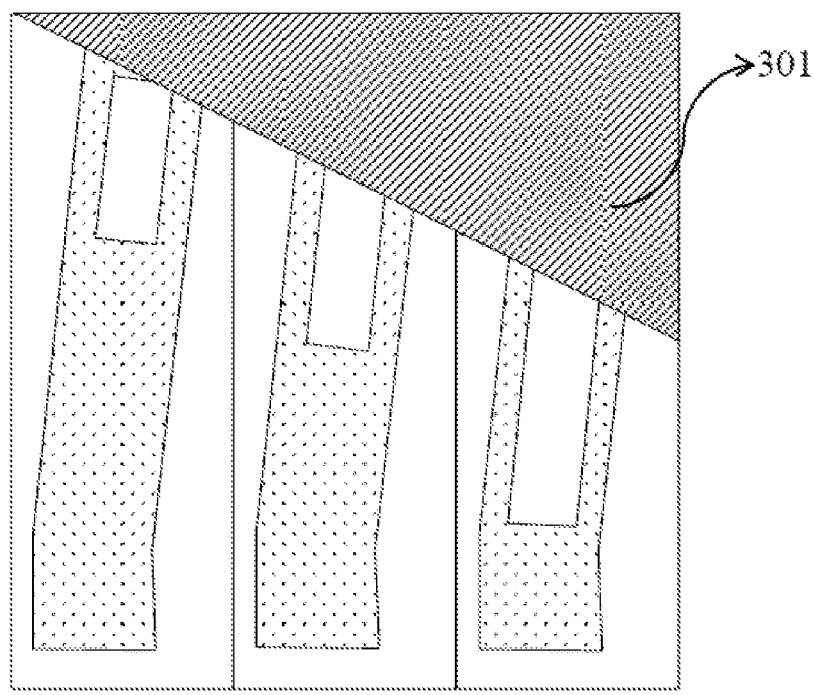
FIG. 11 is a schematic diagram of edge pixels of a special-shaped display panel according to an embodiment of the present disclosure.

FIG. 11 is a schematic diagram of the edge pixels of the special-shaped display panel according to an embodiment of the present disclosure. The special-shaped display panel shown in FIG. 11 is similar to the special-shaped display panel shown in FIGS. 9-10 in structure, which will not be repeated herein. The difference lies in that a contour line of the peripheral light-shading layer 301 covering the first edge pixel, the second edge pixel, and the third edge pixel, is a straight line.

In the present embodiment, it is defined that the area of the aperture portion of each of the edge pixels is S, the transmittance of each of the edge pixels 11 is T, and M=S*T. By setting the lengths of the auxiliary strip-shaped electrodes of the pixel electrodes in all of the edge pixels, the transmittance of each of the edge pixels is regulated such that the M values of the first edge pixel, the second edge pixel, and the third edge pixel are identical, which improves the color cast problem at the edge of the special-shaped the display panel and homogenizes the color display at the edge of the special-shaped display panel while optimizing the edge zigzag texture of the special-shaped display panel, thereby improving the visual effect of the display panel.

The present disclosure further provides a display device including the above-mentioned special-shaped display panel, and the aperture ratios of the edge pixels of different colors are identical, which improves the color cast problem at the edge of the special-shaped the display panel and homogenizes the color display at the edge of the special-shaped display panel while optimizing the edge zigzag texture of the special-shaped display panel, thereby improving the visual effect of the display panel.

It should be noted that, the above are merely preferred embodiments and principles applied therein of the present disclosure. Those skilled in the art should understand that the present disclosure is not limited to the above embodiments, and various notable changes, modifications and substitutions can also be make the present disclosure without departing from the protection scope of the present disclosure. Though the present disclosure is illustrated in detail with the above embodiments, the present disclosure shall include other equivalent embodiments within the scope of the attached claims.

What is claimed is:

1. A special-shaped display panel having a display area and a peripheral area, comprising:
    a peripheral light-shading layer at least partially located in the peripheral area and defining the display area; and
    a plurality of edge pixels, each of the edge pixels comprising an aperture portion located in the display area, and a light-shading portion located in the peripheral area and covered by the peripheral light-shading layer;
    wherein an area of the aperture portion of each of the edge pixels is defined as S, a transmittance of each of the edge pixels is defined as T, it is further defined that M=S*T, and the M values of all of the edge pixels are identical;
    each of the edge pixels comprises a pixel electrode, and a length of the pixel electrode of each of the edge pixels is identical;
    the pixel electrode of each of the edge pixels comprises a block-shaped electrode, at least two strip-shaped electrodes, and a slit located between the at least two the strip-shaped electrodes; tail ends of the at least two strip-shaped electrodes are connected together, and a head end of at least one of the strip-shaped electrodes is connected with the block-shaped electrode;
    the plurality of edge pixels comprises a first edge pixel, a second edge pixel, and a third edge pixel; the first edge pixel, the second edge pixel, and the third edge are adjacent to one another; and in an area corresponding to the first edge pixel, the second edge pixel, and the third edge pixel, an edge of the peripheral light-shading layer toward the edge pixels is shaped like a straight line or like a polygonal line;
    each strip-shaped electrode comprises a main strip-shaped electrode and an auxiliary strip-shaped electrode, and a head end of the main strip-shaped electrode is connected with the block-shaped electrode;
    the pixel electrodes comprise a first pixel electrode corresponding to the first edge pixel, a second pixel electrode corresponding to the second edge pixel, and a third pixel electrode corresponding to the third edge pixel;
    an area of the aperture portion of the first edge pixel is larger than an area of the aperture portion of the second edge pixel, and the area of the aperture portion of the second edge pixel is larger than an area of the aperture portion of the third edge pixel; and
    a length of the auxiliary strip-shaped electrode of the first pixel electrode is smaller than a length of the auxiliary strip-shaped electrode of the second pixel electrode, and the length of the auxiliary strip-shaped electrode of the second pixel electrode is smaller than a length of the auxiliary strip-shaped electrode of the third pixel electrode.

2. The special-shaped display panel according to claim 1, wherein a width of each of the strip-shaped electrodes of the first pixel electrode, a width of each of the strip-shaped electrodes of the second pixel electrode, and a width of each of the strip-shaped electrodes of the third pixel electrode are identical; and
    a width of the slit of the first pixel electrode, a width of the slit of the second pixel electrode, and a width of the slit of the third pixel electrode are identical.

3. The special-shaped display panel according to claim 1, wherein the display area is shaped like a circle, a rhombus, an ellipse, a hexagon, or a triangle.

4. The special-shaped display panel according to claim 1, wherein the slit of the pixel electrode of each of the edge pixels is closed, and head ends of all of the strip-shaped electrodes are respectively connected with the block-shaped electrode;
    a length of the slit of the first pixel electrode is smaller than a length of the slit of the second pixel electrode, and the length of the slit of the second pixel electrode is smaller than a length of the slit of the third pixel electrode.

5. The special-shaped display panel according to claim 4, wherein a width of each of the strip-shaped electrodes of the first pixel electrode, a width of each of the strip-shaped electrodes of the second pixel electrode, and a width of each of the strip-shaped electrodes of the third pixel electrode are identical; and
    a width of the slit of the first pixel electrode, a width of the slit of the second pixel electrode, and a width of the slit of the third pixel electrode are identical.

6. The special-shaped display panel according to claim 1, further comprising an array substrate and a color film substrate opposite to the array substrate, wherein the color film substrate comprises a black matrix and a plurality of color resists, and each of the edge pixels corresponds to one of the color resists.

7. The special-shaped display panel according to claim 6, wherein the first edge pixel corresponds to a red color resist, the second edge pixel corresponds to a green color resist, and the third edge pixel correspond to a blue color resist.

8. A display device, comprising a special-shaped display panel having a display area and a peripheral area, wherein the special-shaped display panel having a display area and a peripheral area comprises:
    a peripheral light-shading layer at least partially located in the peripheral area and defining the display area; and
    a plurality of edge pixels, each of the edge pixels comprising an aperture portion located in the display area, and a light-shading portion located in the peripheral area and covered by the peripheral light-shading layer;
    wherein an area of the aperture portion of each of the edge pixels is defined as S, a transmittance of each of the edge pixels is defined as T, it is further defined that M=S*T, and the M values of all of the edge pixels are identical;
    each of the edge pixels comprises a pixel electrode, and a length of the pixel electrode of each of the edge pixels is identical;
    the pixel electrode of each of the edge pixels comprises a block-shaped electrode, at least two strip-shaped electrodes, and a slit located between the at least two the strip-shaped electrodes; tail ends of the at least two strip-shaped electrodes are connected together, and a head end of at least one of the strip-shaped electrodes is connected with the block-shaped electrode;

the plurality of edge pixels comprises a first edge pixel, a second edge pixel, and a third edge pixel; the first edge pixel, the second edge pixel, and the third edge are adjacent to one another; and in an area corresponding to the first edge pixel, the second edge pixel, and the third edge pixel, an edge of the peripheral light-shading layer toward the edge pixels is shaped like a straight line or like a polygonal line;

each strip-shaped electrode comprises a main strip-shaped electrode and an auxiliary strip-shaped electrode, and a head end of the main strip-shaped electrode is connected with the block-shaped electrode;

the pixel electrodes comprise a first pixel electrode corresponding to the first edge pixel, a second pixel electrode corresponding to the second edge pixel, and a third pixel electrode corresponding to the third edge pixel;

an area of the aperture portion of the first edge pixel is larger than an area of the aperture portion of the second edge pixel, and the area of the aperture portion of the second edge pixel is larger than an area of the aperture portion of the third edge pixel; and a length of the auxiliary strip-shaped electrode of the first pixel electrode is smaller than a length of the auxiliary strip-shaped electrode of the second pixel electrode, and the length of the auxiliary strip-shaped electrode of the second pixel electrode is smaller than a length of the auxiliary strip-shaped electrode of the third pixel electrode.

* * * * *